(12) United States Patent
Ferreira et al.

(10) Patent No.: US 11,526,414 B2
(45) Date of Patent: Dec. 13, 2022

(54) RUNNING COMPUTER DIAGNOSTICS USING DOWNLOADED DISK IMAGES AND USB HUB

(71) Applicant: Lenovo (Singapore) Pte. Ltd., Singapore (SG)

(72) Inventors: Marcelo da Costa Ferreira, São Paulo (BR); Carlos Eduardo Dias Duarte, São Paulo (BR); Gustavo Labbate Godoy, São Paulo (BR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 304 days.

(21) Appl. No.: 17/064,518

(22) Filed: Oct. 6, 2020

(65) Prior Publication Data
US 2022/0107874 A1  Apr. 7, 2022

(51) Int. Cl.
*G06F 11/32* (2006.01)
*G06F 11/30* (2006.01)
*G06F 8/61* (2018.01)
*H04L 67/06* (2022.01)
*G06F 13/40* (2006.01)
*G06F 13/42* (2006.01)
*G06F 8/65* (2018.01)

(52) U.S. Cl.
CPC .............. *G06F 11/321* (2013.01); *G06F 8/63* (2013.01); *G06F 8/65* (2013.01); *G06F 11/3006* (2013.01); *G06F 11/328* (2013.01); *G06F 13/409* (2013.01); *G06F 13/4068* (2013.01); *G06F 13/4282* (2013.01); *H04L 67/06* (2013.01)

(58) Field of Classification Search
CPC . G06F 11/321; G06F 8/63; G06F 8/65; G06F 11/3006; G06F 11/328; G06F 13/4068; G06F 13/409; G06F 13/4282; H04L 67/06; H04L 67/1095
USPC .......................................................... 714/25
See application file for complete search history.

(56) References Cited

U.S. PATENT DOCUMENTS

| | | |
|---|---|---|
| 6,920,553 B1 | 7/2005 | Poisner |
| 9,064,117 B1 | 6/2015 | Worsley |
| 2004/0153823 A1* | 8/2004 | Ansari ............... G06F 11/0793 714/38.14 |
| 2014/0173263 A1 | 6/2014 | Pfeifer, Jr. et al. |
| 2020/0293477 A1* | 9/2020 | Lefebvre ............... G06F 21/606 |

OTHER PUBLICATIONS

"Boot Image", Wikipedia, retrieved Sep. 4, 2020 from https://en.wikipedia.org/wiki/Boot_image.
"Disk Image", Wikipedia, retrieved on Sep. 4, 2020 from https://en.wikipedia.org/wiki/Disk_image.
"ISO Image", Wikipedia, retrieved on Sep. 4, 2020 from https://en.wikipedia.org/wiki/ISO_image.

* cited by examiner

*Primary Examiner* — Yair Leibovich
(74) *Attorney, Agent, or Firm* — John M. Rogitz; John L. Rogitz

(57) ABSTRACT

In one aspect, a first device may download at least one disk image and then provide the disk image to second and third devices through a fourth device that controls connections to the second and third devices. The first device may then run computer diagnostics concurrently on the second and third devices through the fourth device and using the image provided to each of the second and third devices. In some examples, communication between the devices may occur using USB ports.

20 Claims, 7 Drawing Sheets

RUNNING COMPUTER DIAGNOSTICS USING DOWNLOADED DISK IMAGES AND USB HUB

FIELD

The present application relates to technically inventive, non-routine solutions that are necessarily rooted in computer technology and that produce concrete technical improvements.

BACKGROUND

As recognized herein, many modern consumer electronics devices may include a Wi-Fi transceiver but not a separate network interface card. As such, it is often difficult or impossible to boot the device from a remotely-located server to diagnose the device for problems since network communication might not be possible until the local operating system on the device is already booted itself for communication using the Wi-Fi transceiver. As also recognized herein, even if the device can be booted from the remotely located server, network faults can still make performing the diagnostics difficult since breaks in network communication can disrupt the diagnostic process by making the diagnosed device inaccessible. There are currently no adequate solutions to the foregoing computer-related, technological problem.

SUMMARY

Accordingly, in one aspect a first device includes at least one processor as well as first, second, and third universal serial bus (USB) ports. The first device further includes first and second storage areas. The first device also includes storage that is accessible to the at least one processor and that includes instructions executable by the at least one processor to receive first and second disk images via the first USB port, to store the first disk image in the first storage area, and to store the second disk image in the second storage area. The instructions are also executable to load the first disk image from the first storage area into a second device via the second USB port, and to load the second disk image from the second storage area into a third device via the third USB port. The first, second, and third devices are different from each other. The instructions are then executable to concurrently facilitate computer diagnostics of the second and third devices respectively using the first and second disk images.

In some examples, the instructions may be executable to concurrently facilitate computer diagnostics by initiating diagnoses of the second and third devices respectively using the loaded first and second disk images.

Also, in some examples, the instructions may be executable to concurrently facilitate computer diagnostics by routing communications between a fourth device and the second device, and between the fourth device and the third device. The fourth device may control the first device and be different from the first, second, and third devices. In some example implementations, the first device may include the fourth device. Also in some example implementations, the fourth device may include storage with instructions executable by the processor to download the first and second disk images from a remotely-located server, provide the first and second disk images to the first device via the first USB port using a fourth USB port on the fourth device, and to diagnose the second and third devices respectively using the first and second disk images and a computer diagnostics application executing at the fourth device.

Additionally, in some example embodiments the instructions may be executable to concurrently facilitate computer diagnostics by executing at least part of a computer diagnostics application to diagnose the second and third devices. So, for example, the instructions may be executable to concurrently facilitate computer diagnostics by executing at least part of the computer diagnostics application to fix identified issues that pertain to the second and third devices.

Still further, in some example implementations the instructions may be executable to cease communication using the second USB port to update the first disk image as stored in the first storage area, where the first storage area may be associated with the second USB port. The instructions may then be executable to, subsequent to the first disk image being updated as stored in the first storage area, cease communication using the third USB port to update the second disk image as stored in the second storage area. The second storage area may be associated with the third USB port. Still further, if desired the instructions may be executable to, subsequent to the first disk image being updated as stored in the first storage area, reenable communication using the second USB port for communication over the second USB port while communication is ceased using the third USB port.

Also note that in some examples, the first disk image and the second disk image may be copies of the same image. In other examples, the first disk image and the second disk image may not be copies of the same image.

Additionally, in some examples the first and second storage areas may be different from each other. The first and second storage areas may even be embodied in different storage devices.

In another aspect, a method includes downloading, at a first device, one or more disk images from a second device. The method also includes respectively routing, via first and second ports, at least one disk image to each of third and fourth devices for loading into the third and fourth devices. The method further includes running diagnostic software to respectively diagnose, through the first and second ports, the third and fourth devices using the at least one disk image as loaded onto each of the third and fourth devices.

In some examples, the method may include concurrently diagnosing, using the diagnostic software, both the third and fourth devices respectively through the first and second ports.

Also, in some examples, disk images may be routed to the third and fourth devices through a hub device that is different from the first device and that is connected to the first device via a wired connection. The hub device may also be connected to the third and fourth devices through wired connections. In some example implementations, the wired connections may be universal serial bus (USB) connections.

Additionally, note that in some examples the method may include respectively routing, via the first and second ports, different disk images to each of the third and fourth devices for loading into the third and fourth devices.

In still another aspect, at least one apparatus includes at least one computer readable storage medium (CRSM) that is not a transitory signal. The computer readable storage medium includes instructions executable by at least one processor to download one or more disk images, and to provide at least one disk image to a first device via a first port and to provide at least one disk image to a second device via a second port. The first device is different from the second device, and the first port is different from the second port.

The instructions are also executable to concurrently facilitate diagnostics of the first and second devices using the respective disk images provided to the first and second devices.

In some example implementations, the at least one apparatus may include a third device and a fourth device different from the third device. The third device may download the one or more disk images and concurrently facilitate the diagnostics. The fourth device may receive the downloaded one or more disk images from the third device and pass at least one disk image to each of the first and second devices respectively through the first and second ports as located on the fourth device.

The details of present principles, both as to their structure and operation, can best be understood in reference to the accompanying drawings, in which like reference numerals refer to like parts, and in which:

DETAILED DESCRIPTION

Figure 1:
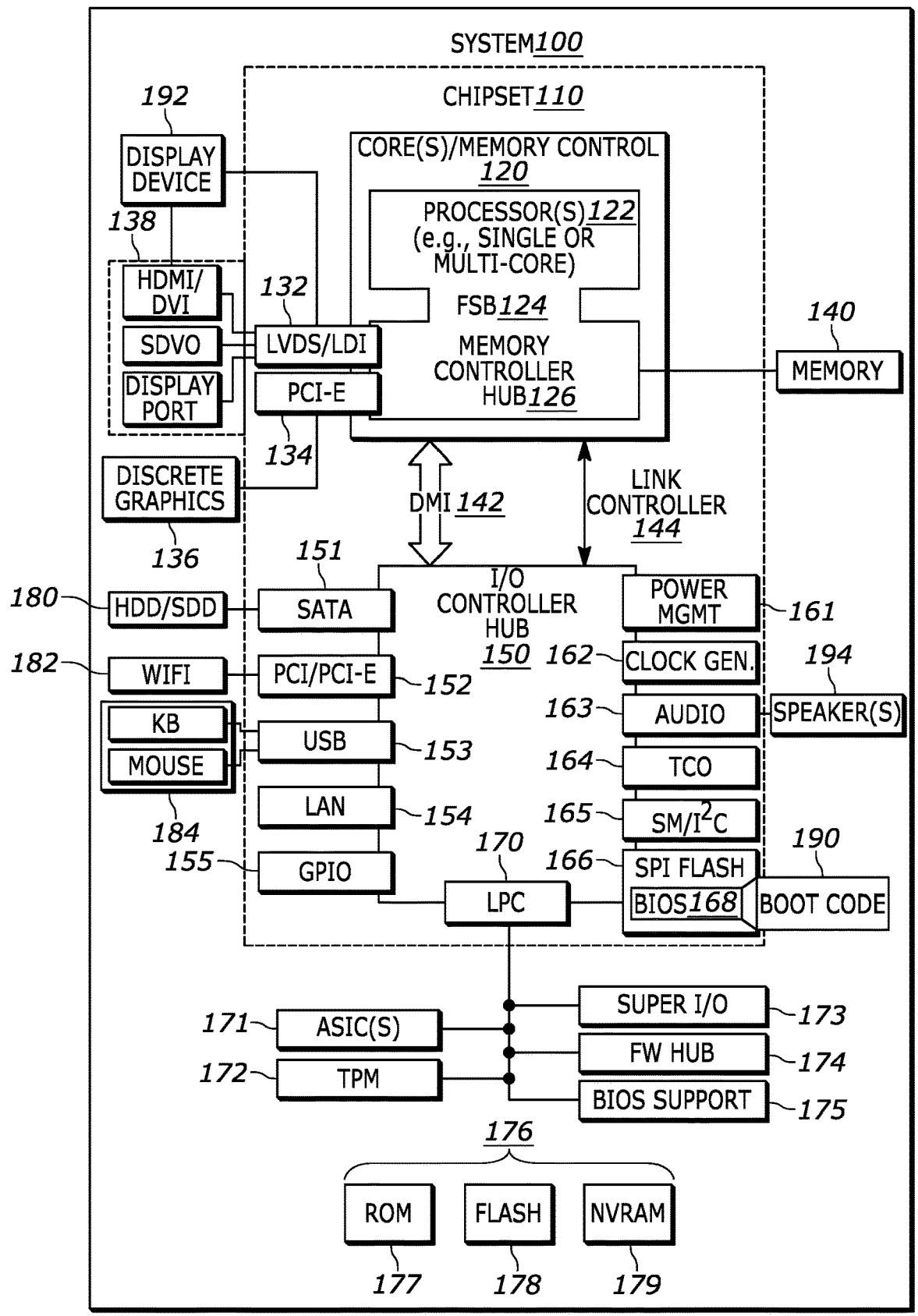
FIG. 1 is a block diagram of an example system consistent with present principles.

Among other things, the present disclosure relates to two devices that may be connected via USB ports to run hardware and software diagnostics on multiple machines at the same time. One of these devices may be referred to as a bootbox while the other device may be referred to as a smart USB hub. The bootbox may have a connection with a remote server to download the most-recent diagnostic ISOs from the server using, e.g., an Ethernet connection. The bootbox may also have a USB connection to load the downloaded images into the machines that are to be tested, evaluated, diagnosed, etc. Between the bootbox and the computers under test may be the smart USB hub. The intelligent USB hub may work as a device that controls its respective USB ports connected to each machine under test.

In various examples, the bootbox may be updated with the most-recent diagnostic ISO(s). It may download the ISOs from the remote server and get them ready to pass through the USB hub to the machines under test. The USB hub may thus establish a microcontroller-based device in certain examples and may be developed using one or more kits similar to Arduino or RaspberryPi that may manage whether an ISO will or will not be available to a machine connected to it. This kit may thus control every port on the USB hub that is connected to a machine to test. In its normal operations, when a device to test is connected to one of the hub's USB ports, the kit may load the ISO and start the hardware diagnostics on that machine. In update mode, the ISO(s) may be updated in a cycled fashion.

Thus, ISOs may be updated and kept available in a local network to run diagnostics, allowing multiple machines to be booted with a diagnostic ISO via a smart USB hub.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces/ports 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
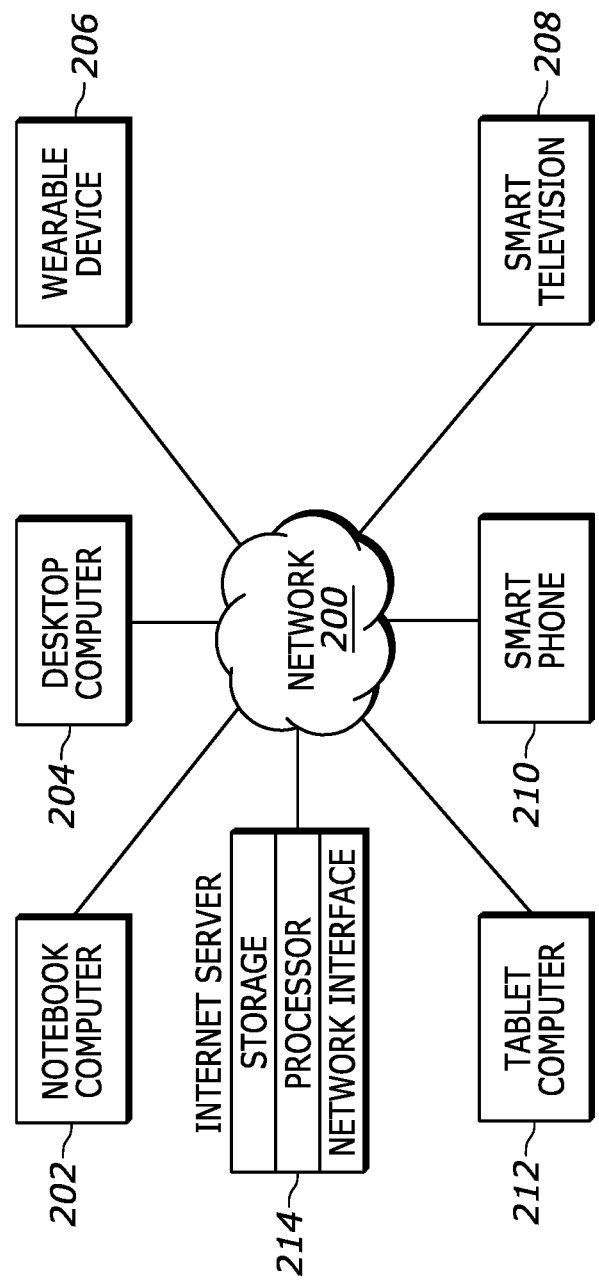
FIG. 2 is a block diagram of an example network of devices consistent with present principles.

Turning now to FIG. 2, example devices are shown communicating over a network 200 such as the Internet in accordance with present principles, e.g., to download disk images. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles. For example, any of the devices 202-212 may be used to download disk images from the server 214 for use as set forth herein.

Figure 3:
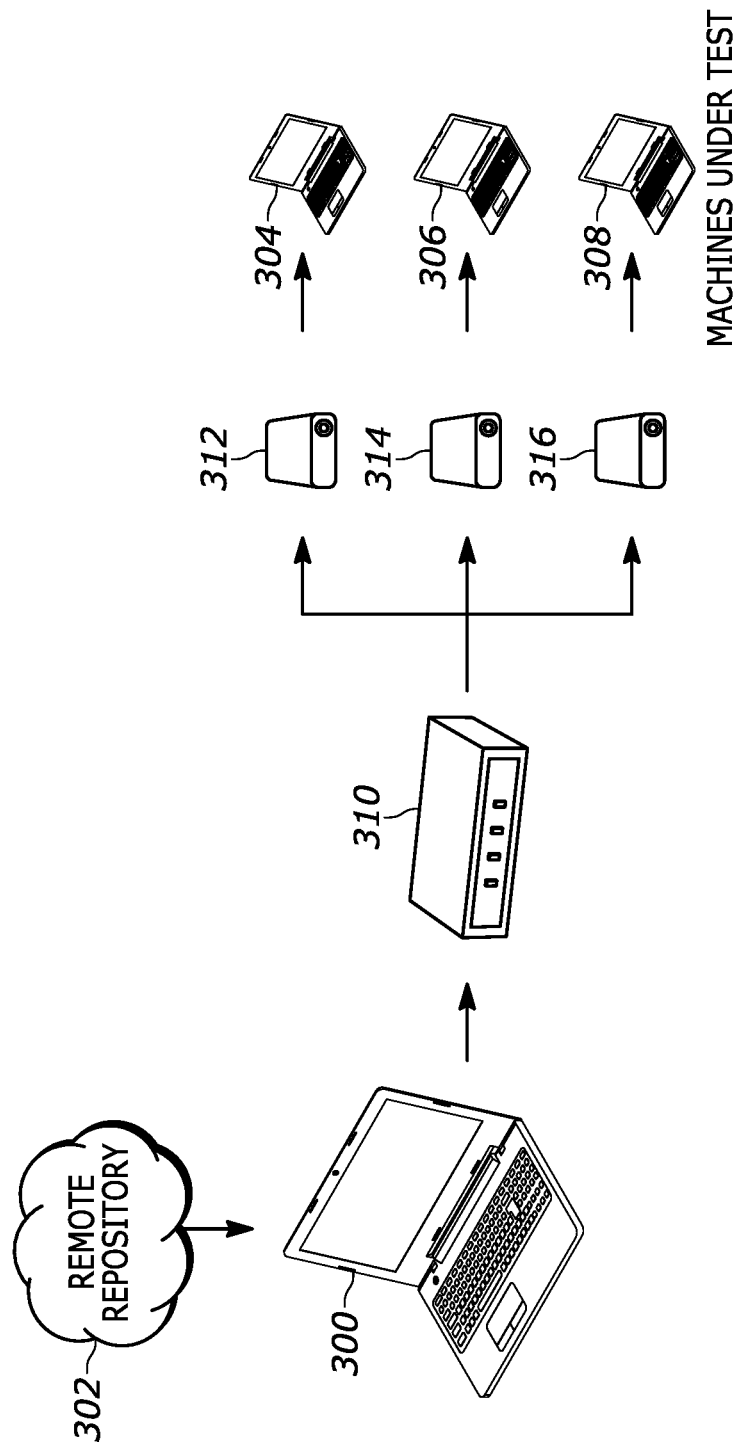
FIG. 3 shows a schematic diagram of an example mobile device and an example hub device being used to diagnose other devices consistent with present principles.

Now in reference to FIG. 3, it shows a schematic diagram of an example implementation consistent with present principles. Specifically, FIG. 3 shows that a mobile device or bootbox such as a laptop computer 300 may download one or more disk images from a remotely located server 302 that serves as a remote repository of the most up-to-date bootable images. The images may be updated in the repository by developers or administrators, who may also manage the server 302 itself. The computer 300 may download the updated image(s) over a wide area network (WAN) such as the Internet using a secure connection (e.g., encrypted communication), for example, and make check for updated image(s) on a recurring basis such as every two or ten minutes as may be set by a system administrator. Also, note that rather than being a laptop, the computer 300 may also be a smartphone, wearable device, or tablet computer for example.

As for the disk images that are downloaded by the computer 300, they may be boot images and/or ISO images, where an ISO image may have an .iso filename extension that itself is named after the International Organization for Standardization. The downloaded image(s) may be loaded into other computers that are to be diagnosed so that the other computers may be booted with such an image and possibly have hardware and software issues fixed. Example computers to diagnose are shown in FIG. 3 as computers 304, 306, and 308. The computers 304-408 may be laptop computers as shown, but may also be smartphones, desktop computers, tablet computers, etc. The images themselves may have, for example, contents and structure of a disk volume or storage device such as a hard disk drive or solid state drive and, as such, may contain a copy of one or more guest operating systems such as Windows, macOS, Android, or Linux, along with individual files like multimedia files and individual software applications such as diagnostic or antivirus software applications.

For an image to be routed from the mobile computer 300 to the computers 304-308, the image may be provided or passed to a hub device 310. The image may be passed using universal serial bus (USB) communication using a USB cable connected to one USB port on the computer 300 and another USB port on the hub device 310. However, also note that wireless USB, micro USB, ethernet, and other communication protocols may be used. For example, Bluetooth communication or WiGig communication may be used or even a secure Wi-Fi connection or local intranet where possible. Coaxial cables and fiber optic cables may also be used.

As also illustrated in FIG. 3, the hub device 310 may house one or plural discrete storage devices 312, 314, 316 providing separate, discrete storage areas within the hub device 310 for the storage of separate disk images received from the computer 300. However, note that discrete storage areas on a single storage device may also be used. In any case, note that each storage area or storage device 312-316 may be associated with a different respective port on the hub device 310. These ports may be different from the one through which disk images are received by the hub device 310 from the computer 300, and may be used for communication between the hub device 310 and computers 304-306 including for loading a respective disk image from a respective storage area 312-316 into a respective device 304-308. So, for example, a disk image stored in area 312 may be loaded into computer 304 to boot computer 304, a disk image stored in area 314 may be loaded into computer 306 to boot computer 306, and a disk image stored in area 316 may be loaded into computer 308 to boot computer 308.

Figure 4:
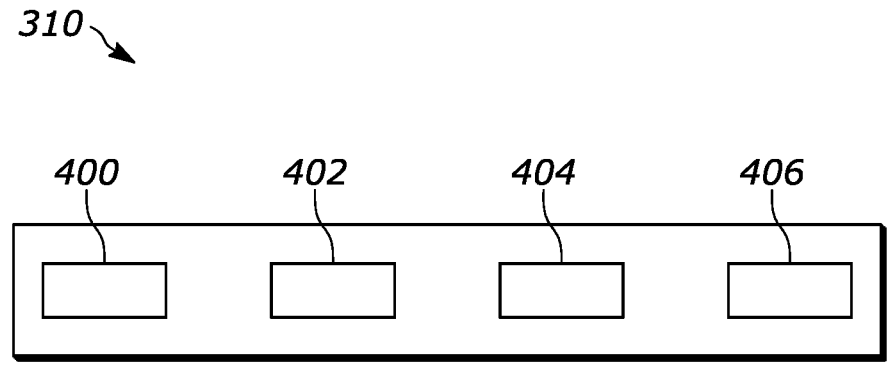
FIG. 4 shows a side elevational view of an example hub device consistent with present principles.

A side elevational view of the hub device 310 is shown in FIG. 4 to further illustrate. As shown, a first port 400 may connect to the computer 300 for receiving an image(s) from the computer 300 to ultimately route to the computers 304-308. To route an image from the computer 300 to the computers 304-308, the hub device 310 may use a second port 402 to pass one image to the computer 304, a third port 404 to pass one image to the computer 306, and a fourth port 406 to pass one image to the computer 308. Thus, there may be a one-for-one correspondence between ports 402-406 and computers 304-308 to be diagnosed. The images may be passed through the ports 402-406 using a wired USB connection or another wired connection type. Additionally, or alternatively, the ports 402-406 may be coupled to or engaged with wireless transceivers for wireless communication, such as each port 402-408 being connected to a wireless USB dongle for wireless USB communication with the computers 304-308. Other types of communication protocols and communication hardware may also be used if desired, such as Bluetooth communication using different Bluetooth transceivers on the hub 310 that are assigned one-for-one to a different respective computer 304-308 also having a Bluetooth transceiver.

The disk images themselves that are loaded onto each of the computers 304-308 may be copies of the same image. However, they may also be different images if, for example, different guest operating systems are to be loaded onto each of the computers 304-308 so that a guest operating system in each loaded image is the same version and/or type as a guest operating system already stored on the respective computer 304-308 itself. For example, an image having a Windows operating system may be loaded onto computer 304 since computer 304 uses Windows already, while an image having an Android operating system may be loaded onto computer 306 since the computer 306 uses Android already.

Describing the separate storage devices 312-316 in more detail, note that they may be established by hard disk drives, solid state drives, flash memory drives or another type of storage device. Together, the devices 312-316 may establish the hub device 310 as a USB mass storage device for storing multiple disk images for use consistent with present principles.

In some examples, the devices 312-316 may even store some or all of the diagnostic software used for diagnosing a respective computer 304-308, along with any software that may be used to repair identified hardware and software problems on the computers 304-308 themselves. Additionally, or alternatively, another dedicated storage device within the hub device 310 may be dedicated to storing the diagnostic and repair software. In some examples, this dedicated storage device or another one within the hub device 310 may also store a kit such as Arduino or RaspberryPi for managing functions of the hub device 310 using a microcontroller or other processor within the hub device 310, including managing connections to the computers 304-308 and whether an image will be made available to each one of the computers 304-308. Also note before moving on that the hub device 310 may include still other components such as RAM and other items described above in reference to FIG. 1.

Concluding the description of FIG. 3, further note that various arrows are shown to illustrate the routing of one or more disk images to the various computers 304-308 for diagnosing the computers 304-308.

Figure 5:
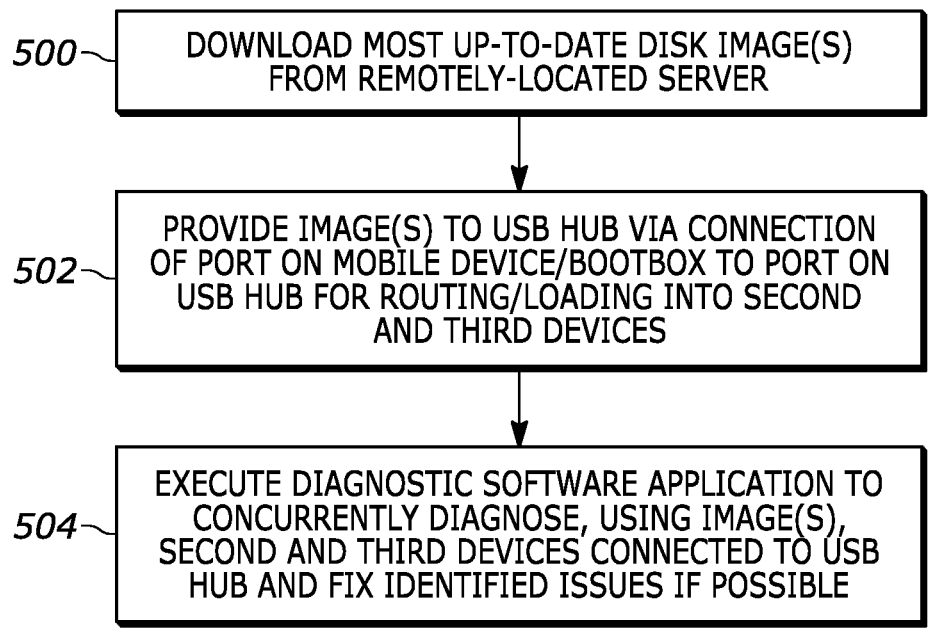
FIG. 5 is a flow chart of an example algorithm that may be executed by a mobile device and/or bootbox consistent with present principles.

Referring now to FIG. 5, it shows example logic that may be executed by a device such as the mobile computer 300 or a bootbox consistent with present principles. Beginning at block 500, the computer may download and locally store the most up-to-date or most recently released disk image(s) that may be needed to diagnose other computers. The image(s) may be downloaded from a remotely located server as described above. Which image(s) are to be downloaded may be determined based on a hub device reporting which computers are to be diagnosed and what are their respective system requirements and operating systems (e.g., as may be determined based on a current connection between the hub device and the respective computer to be diagnosed). Or all available images may be downloaded. Or the most up-to-date versions of specific image types may be downloaded as specified by system administrator. Note that the respective computers to be diagnosed may be diagnosed concurrently and will be referred to below as second and third devices. However, also note that present principles may be used to concurrently diagnose and fix more than two devices as well.

In any case, from block 500 the logic may then proceed to block 502. At block 502 the mobile computer may provide the appropriate image(s) downloaded at block 500 to the hub device using a USB or other connection between the mobile computer and hub device (e.g., using respective USB ports on each device). Again which images are to be provided may be determined based on a request(s) from the hub device for images to load into the second and third devices, as may have been determined by the hub device based on communication with the second and third devices to identify their requirements and specifications (e.g., if the second and third devices are already be connected to the hub device). Or, at block 502 all images downloaded at block 500 may be provided to the hub device and, in some examples, copies of each one may be stored in each respective storage area of the hub device by the hub device itself. Or all images specified by a system administrator may be passed from the mobile computer/bootbox to the hub device at block 502.

From block 502 the logic may then proceed to block 504. At block 504 the mobile device may either wait for an indication from the hub device that the hub device has loaded a respective appropriate image into a respective second or third device, or may control the hub device itself to load the appropriate image.

Then, also at block 504, the mobile device may execute some or all of a diagnostic software application(s) to concurrently analyze the second and third devices as they have been booted with respective images downloaded by the mobile device and routed through the hub device. The application may be executed in order to identify and where possible fix any issues with the second and third devices, whether those issues be defective or malfunctioning software like operating systems and hardware drivers that may be infected with viruses (where the virus should be removed, or the software itself deleted and re-installed), or issues with the device's hardware itself. Additionally, or alternatively, the mobile device may control the hub device to execute some or all of the diagnostic software application at the hub device itself. Note that in various examples, the same diagnostic software application or multiple instances of it may be used to concurrently diagnose multiple devices, including the second and third devices disclosed above.

Also, note that if an issue can be identified but cannot be fixed (such as if a hardware component like a network transceiver, storage device, or port is defective), then at block 504 the mobile device may generate a report that may be presented on its display to indicate to a system administrator or device repair person the issue that has been detected. Moreover, even if an issue has been fixed by the mobile device itself using the diagnostic software application, a report may still be generated and presented indicating the issues that were fixed.

Figure 6:
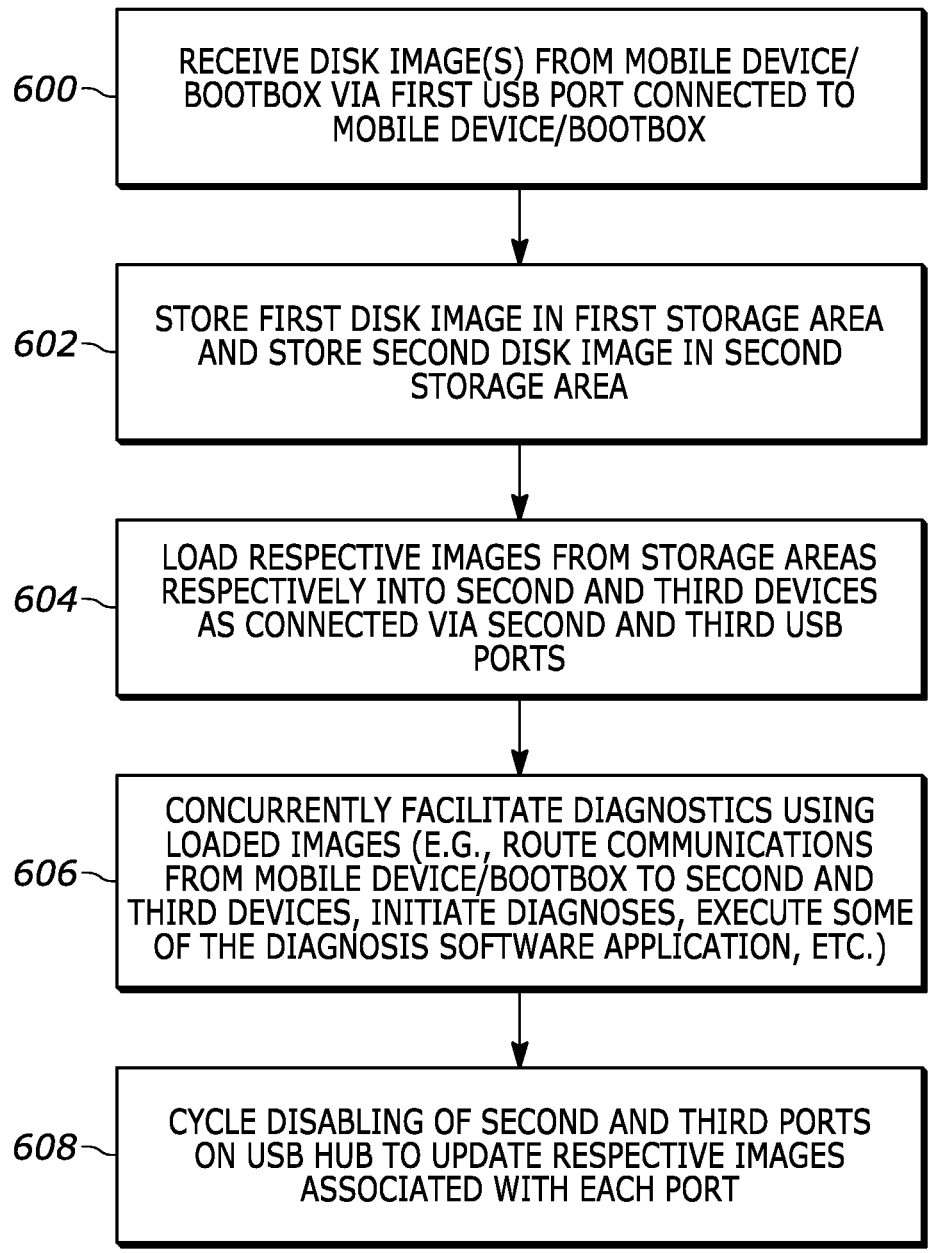
FIG. 6 is a flow chart of an example algorithm that may be executed by a hub device consistent with present principles.

Continuing the detailed description in reference to FIG. 6, it shows example logic that may be executed by a device such as the hub device 310 consistent with present principles. Beginning at block 600, the hub device may receive one or more disk images from a mobile device and/or bootbox via a first USB port on the hub device that connects to the mobile device/bootbox via USB connection. However, again note that other types of connections and communication protocols may also be used.

From block 600 the logic may then proceed to block 602. At block 602 the hub device may store a first disk image received from the mobile device in a first storage area within the hub device, and store a second disk image also received from the mobile device in a second storage area within the hub device that is different from the first storage area. Again, note that the different storage areas may be different discrete areas of a single storage device (e.g., single flash drive) or may be located in different storage devices (e.g., different flash drives housed within the hub device). Also note that each storage area may be associated with and connected to a different port on the hub device for routing the respective image stored therein to a respective computer connected to the hub device through the respective port. Again, the respective computers to be diagnosed will be referred to as second and third devices in the course of the description of FIG. 6.

After block 602 the logic may continue on to block 604. At block 604 the hub device may issue boot commands to the second and third devices over the USB or other connections to them, and then load respective images from the respective storage areas in the hub device into the respective second and third devices to boot the second and third devices using the images. This may be done so that issues or defects with the second and third devices may be identified even if the respective second or third device's own guest operating system has been corrupted or compromised by a hacker or is otherwise malfunctioning or hiding the defect, for example. In some examples, block 604 may be executed responsive to a respective one of the second and third devices being connected to the hub device using a USB or other connection. Also note that in some examples, the second and third devices may have been preloaded at manufacture with a pre-operating system driver for accepting boot commands and disk images from the hub device for disk image booting and diagnostics consistent with present principles.

The logic may then move to block 606 where, after the second and third devices have been booted using images from the hub device, the hub device may facilitate diagnostics concurrently on the second and third device so that both the second and third devices may be diagnosed during the same period of time.

Facilitating diagnostics may include, for example, routing communications from the mobile device/bootbox to the second and third devices so that diagnostic software executing on the mobile device/bootbox may be used to identify and potentially fix issues with the second or third device. Additionally or alternatively, if diagnostic software is included in an image loaded into one of the second and third devices, that software as executing on the second or third device may report its findings and fixes to the mobile device/bootbox using communications routed through the hub device. In addition to or in lieu of that, the hub device itself may execute some or all of the diagnostic software to facilitate diagnoses of the respective second or third device. Still further, note that no matter which device executes the diagnostic software, to facilitate diagnostics the hub device may initiate the software through a command to the respective device responsive to receiving a signal from the second or third device itself that it has been successfully booted using the respective image loaded into it.

From block 606 the logic may then proceed to block 608. At block 608 the hub device may cycle a disabling of ports used to connect the hub device to the second and third devices being diagnosed. To do so, the hub device may activate an "update mode" where it may disable one USB port at a time that is to be used as part of a communication link to a device to be diagnosed (or otherwise cease communication using that port, e.g., if the second or third device is still connected). The USB ports may be disabled, for example, using electrical switches within the hub device or by cutting power to the ports.

During the time that the respective port is disabled, a new/updated image received from the mobile device/bootbox may be stored in the corresponding hub device storage area for that port and associated with the currently disabled port. Also, during this time, the other USB ports connected to other devices being diagnosed may remain available and used for running tests or other diagnostic software on those respective devices.

Once the hub device finishes updating the image associated with the disabled port, the hub device then may reenable that port and continue on to disabling another port to update another image associated with the next port. This process may continue until all ports used to connect to other devices to diagnose are sequentially updated to be associated with a most-recent appropriate disk image known to the mobile device/bootbox.

In some examples, the mobile device/bootbox may control the hub device for image updates and port cycling using an application developed to work with the hub device for doing so. This same application may be used not just to control the hub device in update mode but to also control the hub device in "normal" mode as it executes, e.g., blocks 600-606. The application may be developed by a system administrator or device manufacturer, for example, and may be designed to work with the software kit executing at the hub device, which again may be one similar to Arduino or RaspberryPi. Also note that the logic of FIG. 6 may therefore be executed by such a kit as well in some examples.

Before moving on to the description of other figures, note that the updating of an image/port in update mode may not occur in the middle of the diagnosis of a device connected to that port in some examples, though it may in other examples. If occurring in the middle of the diagnosis, the diagnosis may be interrupted and after the update the diagnostic process may either start over or pick up where it left off prior to the update. However, in examples where a port/image update is not to occur in the middle of a diagnosis, the update of any given port may be initiated responsive to another device being disconnected/unplugged from the hub device through the respective port, responsive to a diagnosis process being completed for the connected device and/or any possible fixes being performed for the connected device, and/or when the respective port senses no device being connected at all.

Figure 7:
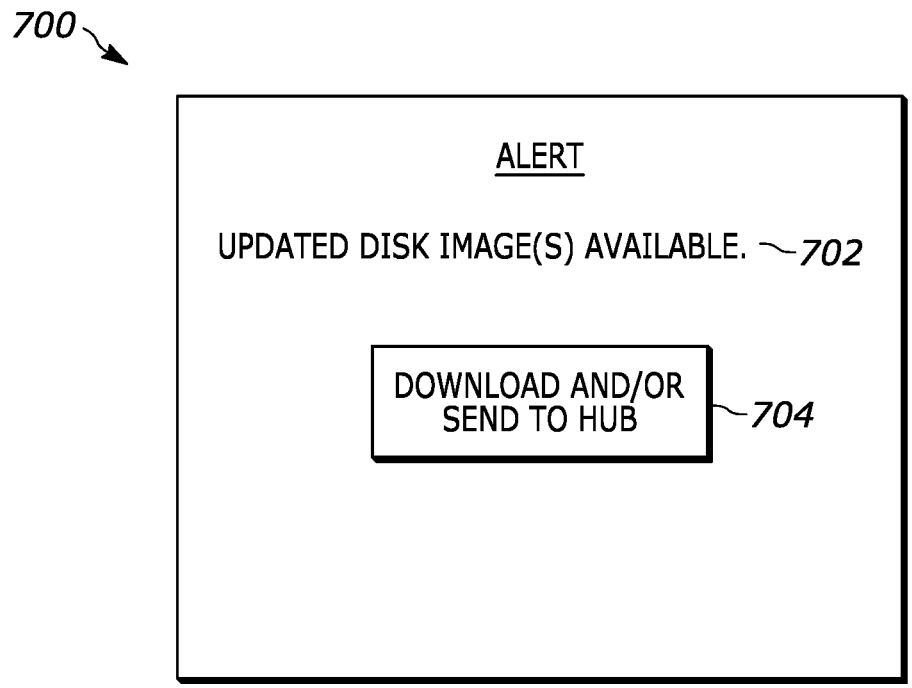
FIGS. 7-8 show graphical user interfaces (GUIs) that may be presented on the display of a mobile device and/or bootbox consistent with present principles.

Now in reference to FIG. 7, it shows an example graphical user interface (GUI) 700 that may be presented on the display of a mobile device/bootbox as described above. As shown in FIG. 7, the GUI 700 may include a prompt 702 indicating that updated disk images are available for download or have already been downloaded by the mobile device. The GUI 700 may also include a selector 704 that may be selectable using touch or cursor input to command the mobile device to send the updated image(s) to a connected hub device for update as described above (if the image(s) have already been downloaded). If the image(s) have not already been downloaded, the selector 704 may be selectable to command the mobile device both download the image(s) and then send them to the connected hub device. However, notwithstanding FIG. 7, note further that in some examples image updates may be downloaded and then sent to the connected hub device autonomously by the mobile device without receiving input directed to the selector 704.

Figure 8:
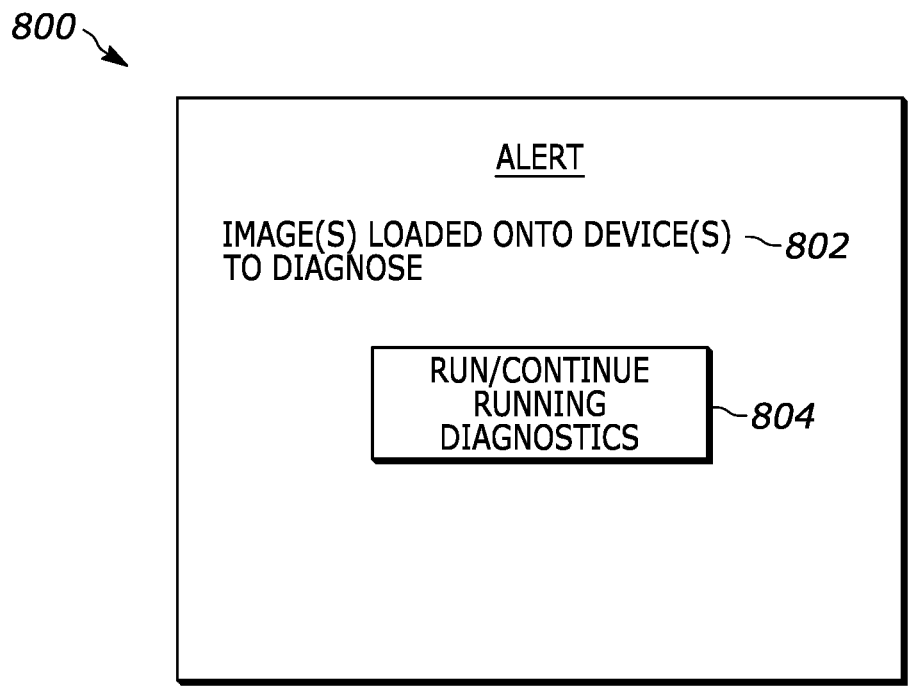

Moving on to FIG. 8, it shows another example GUI 800 that may be presented on the display of the mobile device. The GUI 800 may be presented responsive to a disk image being loaded onto or otherwise used to boot another device to be diagnosed, as may have been communicated to the mobile device by the hub device. As shown, the GUI 800 may include a prompt 802 indicating that the image(s) have been loaded onto the corresponding device(s) to diagnose. The GUI 800 may also include a selector 804 that may be selectable to transmit a command from the mobile device to the hub device and/or device-to-diagnose to begin running diagnostics or to continue running diagnostics (e.g., if the diagnostic process was interrupted to update a disk image being used). However, notwithstanding FIG. 8, note that in some examples diagnostics may be initiated or continue autonomously without receiving input directed to the selector 804.

Figure 9:
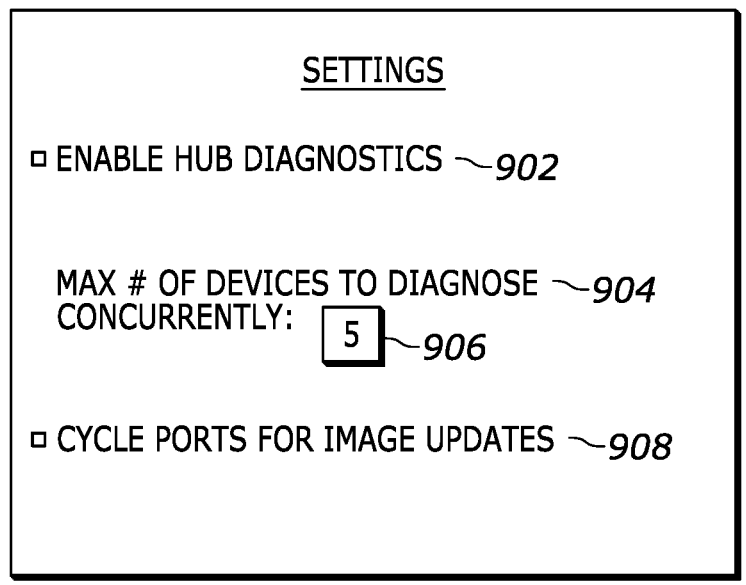
FIG. 9 shows an example settings GUI that may also be presented on the display of a mobile device and/or bootbox consistent with present principles.

Continuing the detailed description in reference to FIG. 9, it shows yet another GUI 900 that may be presented on the display of the mobile device. The GUI 900 may be used for configuring one or more settings of the mobile device and/or connected hub device, and as such each respective setting to be discussed below may be selected by directing touch or cursor input to the respective check box shown adjacent to the respective option.

As shown in FIG. 9, the GUI 900 may include a first setting 902 that may be selected to set or enable the mobile device and/or hub device to undertake present principles. For example, the setting 902 may be selected to set or configure the mobile device to in the future undertake the logic of FIG. 5, and/or to set or configure the hub device to in the future undertake the logic of FIG. 6.

An option 904 may also be presented on the GUI 900 for an end-user or system administrator to, via number entry box 906, specify a maximum number of devices that the mobile device and/or hub device are to diagnose concurrently. This feature may be used to reduce the processing load on the mobile device and/or hub device, if desired. In this example, the maximum number of devices has been set to five.

FIG. 9 also shows that the GUI 900 may include an option 908 that may be selectable to set or enable the mobile device and/or hub device to cycle ports to perform image updates as described above in reference to FIG. 6. However, also note that in some examples the option 908 need not be presented and the mobile device and/or hub device may be configured to do so automatically.

It may now be appreciated that present principles provide for an improved computer-based interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. A first device, comprising:
at least one processor;
first, second, and third universal serial bus (USB) ports;
first and second storage areas; and
storage accessible to the at least one processor and comprising first instructions executable by the at least one processor to:
receive first and second disk images via the first USB port;
store the first disk image in the first storage area;
store the second disk image in the second storage area;
load the first disk image from the first storage area into a second device via the second USB port,
load the second disk image from the second storage area into a third device via the third USB port, the first, second, and third devices being different from each other; and
concurrently facilitate computer diagnostics of the second and third devices respectively using the first and second disk images by routing communications between a fourth device and the second device and between the fourth device and the third device, the fourth device controlling the first device, the fourth device being different from the first, second, and third devices;
wherein the first device comprises the fourth device; and
wherein the fourth device comprises storage with second instructions executable by the at least one processor to:
download the first and second disk images from a remotely located server;
provide the first and second disk images to the first device via the first USB port using a fourth USB port on the fourth device; and
diagnose the second and third devices respectively using the first and second disk images and a computer diagnostics application executing at the fourth device.

2. The first device of claim 1, wherein the first instructions are executable to:
concurrently facilitate computer diagnostics by initiating diagnoses of the second and third devices respectively using the loaded first and second disk images.

3. The first device of claim 1, wherein the first instructions are executable to:
concurrently facilitate computer diagnostics by executing at least part of the computer diagnostics application to diagnose the second and third devices.

4. The first device of claim 3, wherein the first instructions are executable to:
   concurrently facilitate computer diagnostics by executing at least part of the computer diagnostics application to fix identified issues that pertain to the second and third devices.

5. The first device of claim 1, wherein the first instructions are executable to:
   cease communication using the second USB port to update the first disk image as stored in the first storage area, the first storage area associated with the second USB port; and
   subsequent to the first disk image being updated as stored in the first storage area, cease communication using the third USB port to update the second disk image as stored in the second storage area, the second storage area associated with the third USB port.

6. The first device of claim 5, wherein the first instructions are executable to:
   subsequent to the first disk image being updated as stored in the first storage area, reenable communication using the second USB port for communication over the second USB port while communication is ceased using the third USB port.

7. The first device of claim 1, wherein the first disk image and the second disk image are copies of a same image.

8. The first device of claim 1, wherein the first disk image and the second disk image are not copies of a same image.

9. The first device of claim 1, wherein the first and second storage areas are different from each other.

10. The first device of claim 9, wherein the first and second storage areas are embodied in different storage devices.

11. A method, comprising:
   at a first device with first, second, and third universal serial bus (USB) ports and with first and second storage areas:
   receiving first and second disk images via the first USB port;
   storing the first disk image in the first storage area;
   storing the second disk image in the second storage area;
   loading the first disk image from the first storage area into a second device via the second USB port;
   loading the second disk image from the second storage area into a third device via the third USB port, the first, second, and third devices being different from each other;
   concurrently facilitating computer diagnostics of the second and third devices respectively using the first and second disk images;
   ceasing communication using the second USB port to update the first disk image as stored in the first storage area, the first storage area associated with the second USB port; and
   subsequent to the first disk image being updated as stored in the first storage area, ceasing communication using the third USB port to update the second disk image as stored in the second storage area, the second storage area associated with the third USB port.

12. The method of claim 11, comprising:
   subsequent to the first disk image being updated as stored in the first storage area, reenabling communication using the second USB port for communication over the second USB port while communication is ceased using the third USB port.

13. The method of claim 11, comprising:
   concurrently facilitating computer diagnostics of the second and third devices respectively using the first and second disk images by routing communications between a fourth device and the second device and between the fourth device and the third device, the fourth device controlling the first device, the fourth device being different from the first, second, and third devices; and
   at the fourth device:
   downloading the first and second disk images from a remotely located server;
   providing the first and second disk images to the first device via the first USB port using a fourth USB port on the fourth device; and
   diagnosing the second and third devices respectively using the first and second disk images and a computer diagnostics application executing at the fourth device.

14. The method of claim 11, comprising:
   concurrently facilitating computer diagnostics by initiating diagnoses of the second and third devices respectively using the loaded first and second disk images.

15. The method of claim 11, comprising:
   concurrently facilitating computer diagnostics by executing at least part of a computer diagnostics application to diagnose the second and third devices.

16. The method of claim 15, comprising:
   concurrently facilitate computer diagnostics by executing at least part of the computer diagnostics application to fix identified issues that pertain to the second and third devices.

17. At least one apparatus, comprising:
   at least one non-transitory computer readable storage medium (CRSM), the at least one non-transitory CRSM comprising instructions executable by at least one processor of a first device to:
   receive first and second disk images via a first universal serial bus (USB) port;
   store the first disk image in a first storage area;
   store the second disk image in a second storage area;
   load the first disk image from the first storage area into a second device via a second USB port;
   load the second disk image from the second storage area into a third device via a third USB port, the first, second, and third devices being different from each other;
   concurrently facilitate computer diagnostics of the second and third devices respectively using the first and second disk images;
   cease communication using the second USB port to update the first disk image as stored in the first storage area, the first storage area associated with the second USB port; and
   subsequent to the first disk image being updated as stored in the first storage area, cease communication using the third USB port to update the second disk image as stored in the second storage area, the second storage area associated with the third USB port.

18. The at least one apparatus of claim 17, wherein the instructions are executable to:
   subsequent to the first disk image being updated as stored in the first storage area, reenable communication using the second USB port for communication over the second USB port while communication is ceased using the third USB port.

19. The at least one apparatus of claim 17, wherein the instructions are executable to:

concurrently facilitate computer diagnostics of the second and third devices respectively using the first and second disk images by routing communications between a fourth device and the second device and between the fourth device and the third device, the fourth device controlling the first device, the fourth device being different from the first, second, and third devices;

download the first and second disk images from a remotely located server;

provide the first and second disk images via the first USB port using a fourth USB port on the fourth device; and diagnose the second and third devices respectively using the first and second disk images and a computer diagnostics application executing at the fourth device.

20. The at least one apparatus of claim 17, wherein the instructions are executable to:

concurrently facilitate computer diagnostics by initiating diagnoses of the second and third devices respectively using the loaded first and second disk image.

\* \* \* \* \*